United States Patent Office 3,445,432
Patented May 20, 1969

3,445,432
REACTION OF A SPACED POLYPHENOL, PHENOL AND AN ALDEHYDE
John D. Nelson, Pittsfield, Mass., assignor to General Electric Company, a corporation of New York
No Drawing. Continuation-in-part of application Ser. No. 549,463, May 12, 1966. This application Aug. 15, 1968, Ser. No. 752,764
Int. Cl. C08g 5/10; B32b 27/10
U.S. Cl. 260—51          8 Claims

ABSTRACT OF THE DISCLOSURE

An improved process for preparing resinous condensation products, which improved process consists of reacting a methylolated spaced polyphenol with a monohydric phenol in the presence of a particular catalyst at a temperature of at least 130° C. to produce a cross-condensate. The cross-condensate is then reacted with an aldehyde such as formaldehyde in the presence of the same particular catalyst and at a temperature of at least 130° C. The particular catalyst may be either an earth-alkali metal, earth metal or heavy metal hydroxide or oxide and the total aldehyde employed must be less than 1 mole thereof per mole of spaced polyphenol and monohydric phenol combined. The preferred catalyst employed herein is magnesium hydroxide.

---

This application is a continuation-in-part of copending application Ser. No. 549,463 filed May 12, 1966 now abandoned.

This invention relates to an improved process for preparing resinous condensation products by reacting the reaction product of a methylolated spaced polyphenol and a phenol with an aldehyde, and to thermosettable products therefrom.

Generally, it has been known to prepare condensation reaction products by reacting the reaction products of a methylolated spaced polyphenol and phenol with an aldehyde to prepare particular resinous products. These resinous products are of the type which can be advanced to an infusible state by the application of heat and in the presence of a cross-linking agent such as hexamethylenetetramine. The methylolated spaced polyphenol is prepared by reacting a spaced polyphenol with paraformaldehyde and then reacting the methylolated spaced polyphenol with a phenol in the presence of a strong acid catalyst such as sulfuric acid. This reaction product is often referred to as a cross-condensation reaction product or cross-condensate. The cross-condensate can then be reacted with an aldehyde to form a resinous condensation reaction product. This process is fully disclosed in U.S. Patent 2,859,204. However, in the practice of the prior art, gelled resin particles occur in the resinous condensation reaction product which when employed for molding articles results in an unsatisfactory molded article having surface defects due to the gelled particles. The prior art shows filtering of the resin which is necessary in order to remove such particles. However, filtering is difficult, time consuming and uneconomical. In addition, the resins so prepared are not easily grindable due to being soft and in some cases tacky. It has now been surprisingly discovered that the gelled products can be eliminated completely by an improved process over that of the prior art.

Therefore, it is an object of this invention to provide an improved process for preparing particular resinous condensation products.

Another object of this invention is to provide a resinous condensation product free of gelled particles.

Still another object of this invention is to provide a thermosettable resinous condensation composition.

Yet another object of this invention is to provide a thermoset resinous condensation product.

These and other objects will become apparent to one skilled in the art from the following description thereof.

Briefly, in accordance with the practice of this invention, these and other objects are obtained by reacting a methylolated spaced polyphenol with a phenol in the presence of a particular catalyst and at a temperature of at least 130° C. to produce a condensation product which may be termed as a cross-condensate and then reacting the resulting cross-condensate with an aldehyde in the presence of the same particular catalyst and at a temperature of at least 130° C. By carrying out the reaction in the presence of the particular catalyst and at a temperature of at least 130° C., the resulting product is completely free of any undesirable gelled resin particles and therefore does not require the need for filtering. The condensation reaction product is a clear homogeneous single-phase resin.

The following examples are set forth to illustrate more clearly the principle and practice of this invention to those skilled in the art and are not meant to be limiting in the practice thereof, and unless otherwise specified, where parts or percentages are mentioned, they are parts or percentages by weight.

Example I

To a reaction kettle fitted with a reflux condenser, 24 parts of a methylolated spaced polyphenol, prepared by reacting a spaced polyphenol with paraformaldehyde in the presence of a magnesium hydroxide catalyst, and 31 parts of phenol are added. The spaced polyphenol is prepared by alkylation of phenol with a chlorinated paraffin wax. Specifically, the spaced polyphenol employed herein is Flexiphen 160 produced by Koppers Company, Inc. and fully described in Bulletin P.D. 105. The spaced polyphenol is a polymethylene polyphenol mixture containing 2 to 4 phenolic nuclei separated by polymethylene chains of approximately 25 carbon atoms. The reactants are heated to 140° C. in the presence of a magnesium hydroxide catalyst to form the cross-condensation reaction product. To this is then added 4.5 parts of paraformaldehyde over a period of 30 minutes while maintaining a temperature of 140° C. and under reflux conditions. The excess phenol is stripped off under vacuum distillation. Upon cooling, the resin solidifies to a clear single-phase homogeneous resin which is easily grindable.

Example II

Example I is repeated except that the spaced polyphenol employed herein is one as prepared by Example I of U.S. Patent 2,800,512.

The results obtained are essentially the same as Example I.

Example III

Example I is repeated except that a sodium hydroxide catalyst is employed in place of the magnesium hydroxide catalyst in the preparation of the methylolated spaced polyphenol and in the reaction of the methylolated spaced polyphenol and phenol to form the cross-condensate. The resin soldifies before complete addition of paraformaldehyde.

Example IV

Example I is repeated except that a temperature of 90° C. is employed instead of 140° C. The resin gels during the reaction of the cross-condensate with the paraformaldehyde.

Example V

Example I is repeated except that in place of the magnesium hydroxide employed as the catalyst during the reaction to form the cross-condensate, sulfuric acid is employed therein. The resulting resin is a non-homogeneous, tacky solid resin containing particles of gelled resin.

Example VI

Example I is repeated except that calcium hydroxide is employed in place of the magnesium hydroxide. The results obtained are the same as in Example I.

The instant invention is directed to an improved process for preparing resinous condensation products of a methylolated spaced polyphenol, a phenol and an aldehyde. The improvement is found in reacting the methylolated spaced polyphenol and phenol in the presence of a particular catalyst and at a temperature of at least 130° C. to form a condensation product which is termed a cross-condensate, and then reacting the resulting cross-condensate with an aldehyde in the presence of the same particular catalyst and at a temperature of at least 130° C. The particular catalysts employed herein are selected from the group consisting of earth alkali metal, earth metal and heavy metal hydroxides and oxides. In addition, the total aldehyde reacted herein is less than one mole thereof per mole of spaced polyphenol and phenol combined. The surprising and critical feature of the instant invention is that the same catalyst and the same reaction temperature of at least 130° C. are employed in (1) the reaction of a methylolated spaced polyphenol and a phenol to form the cross-condensate and (2) the reaction of the cross-condensate with an aldehyde. In addition, the product so obtained is a clear single phase homogeneous resin. Depending upon the amout of aldehyde employed during the reaction thereof with the cross-condensate, the resulting reaction product may be either a liquid or a solid with the solid state being the preferred state of the resin since it is best suited for molding applications. The solid resin of this invention is easily grindable to provide a finely divided resin which does not cake upon standing.

Previously, it has been known to react such materials as a methylolated spaced polyphenol and a phenol in the presence of a strong acid such as sulfuric acid and at a temperature of around 90° C. and thereafter reacting the cross-condensate with an aldehyde in the presence of an acid catalyst. In this known practice, a material is obtained which contains gelled resin particles resulting in a product which is commercially unacceptable and not suitable for use. While filtering will remove the gelled resin particles, the filtering operation is difficult and time consuming. In addition, the resin so formed is not easily grindable.

As stated previously, the particular catalyst employed herein can be either an earth alkali metal, earth metal or heavy metal hydroxide or oxide. Examples of some of the catalysts employed in the practice of this invention are barium hydroxide, magnesium hydroxide, calcium hydroxide, aluminum oxide, aluminum hydroxide, zinc oxide, zinc hydroxide, iron oxide, manganese oxide, lead oxide, tin oxide, silver oxide, copper oxide, cobalt oxide, etc. Preferably in the practice of this invention, magnesium hydroxide is the preferred catalyst.

As discussed previously, the condensation products prepared in accordance with the practice of this invention are the reaction products of a methylolated spaced polyphenol, a phenol and an aldehyde. Specifically, it is the cross-condensation reaction products of a methylolated spaced polyphenol and a phenol which are reacted with an aldehyde. The resulting condensation reaction product is the reaction product of less than one mole of total aldehyde per mole of spaced polyphenol and phenol combined. The total aldehyde reacted is the aldehyde used to methylolate the spaced polyphenol and the aldehyde employed in the reaction thereof with the cross-condensate. It is preferable to react 0.5–0.9 and more particularly 0.6–0.8 mole of total aldehyde per mole of the spaced polyphenol and phenol combined.

As used in the practice of this invention, an aldehyde shall mean any aldehyde which will react with a phenol. These include such aldehydes as paraformaldehyde, formaldehyde, acetaldehyde, butyraldehyde, furfuraldehyde, etc. Preferably, the aldehyde employed in the practice of this invention is paraformaldehyde.

In addition to the above, a phenol as employed herein shall mean monohydric phenols such as monohydroxybenzene (phenol) and substituted phenols containing alkyl groups, alkoxy groups and halogen radicals. Again, the preferred material to be employed in the practice of this invention is phenol, the monohydroxybenzene.

The spaced polyphenols employed in the practice of this invention are those as fully described in U.S. Patents 2,800,512 and 2,859,204. These are generally prepared by reacting a phenol with a chlorinated hydrocarbon such as a chlorinated paraffin wax. This may be better described as the alkylation of a phenol with a chlorinated hydrocarbon. While spaced polyphenols are considered the broader term as described in U.S. Patent 2,859,204, they are also known in the art as "waxphenols." Broadly, the spaced polyphenols as employed in the practice of the instant invention cover a polyarylolated hydrocarbon having phenolic nuclei separated from each other by polymethylene chains. Generally in the preparation of these spaced polyphenols, the reaction of the chlorinated hydrocarbon and the phenol are carried out in the presence of a Friedel-Crafts catalyst at elevated temperatures. In addition, the phenol employed in the preparation of these spaced polyphenols may be either phenol, resorcinol, hydroquinone, catechol, xylenol, hydroxydiphenyl, benzylphenol, phenolethylphenyl, methylhydroxydiphenyl, ethylhydroxydiphenyl, alpha and beta naphthols, alkyl naphthols, phenyl naphthol, tolyl naphthol, xylyl naphthol, benzyl naphthol, etc. as well as halogenated and etherified derivatives thereof. A further description of commercially available spaced polyphenols can be found in Koppers Company, Inc. Bulletin P.D. 105. However, the examples of U.S. Patent 2,800,512 fully describe the process for preparing spaced polyphenols.

The methylolated spaced polyphenol employed herein is prepared by methylolation of a spaced polyphenol. The catalyst employed to prepare the methylolated spaced polyphenol employed in the practice of the instant invention can be any of the catalysts as set forth previously. However, if a strong alkaline catalyst is employed such as sodium hydroxide or one of the other alkali metal hydroxides, the catalyst must be first neutralized before adding the particular catalyst of the type employed herein. If a catalyst of the type employed herein is used during methylolation of the spaced polyphenol, neutralization is not necessary.

The products prepared by the improved process of this invention require further reaction thereof with an external cross-linking agent in order to be advanced to an infusible state. As is known in the art, such materials containing external cross-linking agents are classified as two-stage resins. Generally, the cross-linking agent can be any material which will cause the resin to advance to the thermoset or infusible state upon exposure to elevated temperatures. In the practice of this invention to prepare thermosettable condensation products, the preferred cross-linking agent is hexamethylenetetramine. The amount of hexamethylenetetramine incorporated with the condensation reaction products prepared by the improved process of this invention can vary from as little as 5 weight percent to as high as 25 weight percent based on the total weight of the thermosettable composition. Preferably the range varies from about 12–18 weight percent.

To provide a thermoset resin, the thermosettable resin is merely exposed to elevated temperatures in order to advance the resin to an infusible state. The temperatures employed can range from about 85° C. to 200° C. The higher the temperature, the shorter the time required to advance the resin to an infusible state.

The products produced by the improved process of this invention find wide use in such applications as molding powders, laminates, foundry sands, core binders, adhesives, etc. In addition, various fillers and other materials including dyes can be incorporated with the resin. Further, the compositions of this invention have shorter cure or setting up times and, therefore, shorter molding times. The alkaline catalyst and the elevated reaction temperature of at least 130° C. promote ortho-ortho linkage which results in the faster cure times. In addition, molded articles employing the resin composition of this invention have excellent hot rigidity.

It will thus be seen that the objects set fourth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. In an improved method for preparing resinous condensation products, which process comprises reacting a methylolated spaced polyphenol with a phenol to form a cross-condensate; the improvement which consists of reacting the methylolated spaced polyphenol with phenol in the presence of a particular catalyst and at a temperature of at least 130° C., said spaced polyphenol consisting of a polyarylolated hydrocarbon having phenolic nuclei separated from each other by polymethylene chains, and thereafter reacting the cross-condensate with an aldehyde in the presence of the same particular catalyst and at a temperature of at least 130° C., and wherein said particular catalyst is selected from the group consisting of earth alakli metal, earth metal and heavy metal hydroxides and oxides and wherein the total aldehyde reacted is less than one mole thereof per mole of spaced polyphenol and phenol combined, said aldehyde being selected from the group consisting of paraformaldehyde, formaldehyde, acetaldehyde, and butyraldehyde.

2. The process of claim 1 wherein the aldehyde is paraformaldehyde.

3. The process of claim 1 wherein the catalyst is magnesium hydroxide.

4. The process of claim 1 wherein 0.5–0.9 mole of an aldehyde is reacted per mole of spaced polyphenol and phenol combined.

5. The process of claim 1 wherein the temperature is 130–200° C.

6. A solid resinous condensation product prepared by the process of claim 1.

7. The product of claim 6 having in admixture therewith an external cross-linking agent.

8. The product of claim 6 having in admixture therewith 5–25% of hexamethylenetetramine and a filler.

References Cited

UNITED STATES PATENTS

| 2,859,203 | 11/1958 | Fiedler et al. | 260—51 |
| 2,859,204 | 11/1958 | Florentine et al. | 260—51 |
| 3,244,648 | 4/1966 | Bornstein | 260—3 |
| 3,390,128 | 6/1968 | Hughes et al. | 260—51 |

OTHER REFERENCES

Koppers Bulletin P.D. 105, December 1962, pp. 1–9.

WILLIAM H. SHORT, *Primary Examiner.*

HOWARD SCHAIN, *Assistant Examiner.*

U.S. Cl. X.R.

161—264; 260—52, 53, 54, 55, 56, 59